March 21, 1967  G. R. COGAR  3,310,660
ASYNCHRONOUS COUNTING DEVICES
Filed April 23, 1963  8 Sheets-Sheet 3

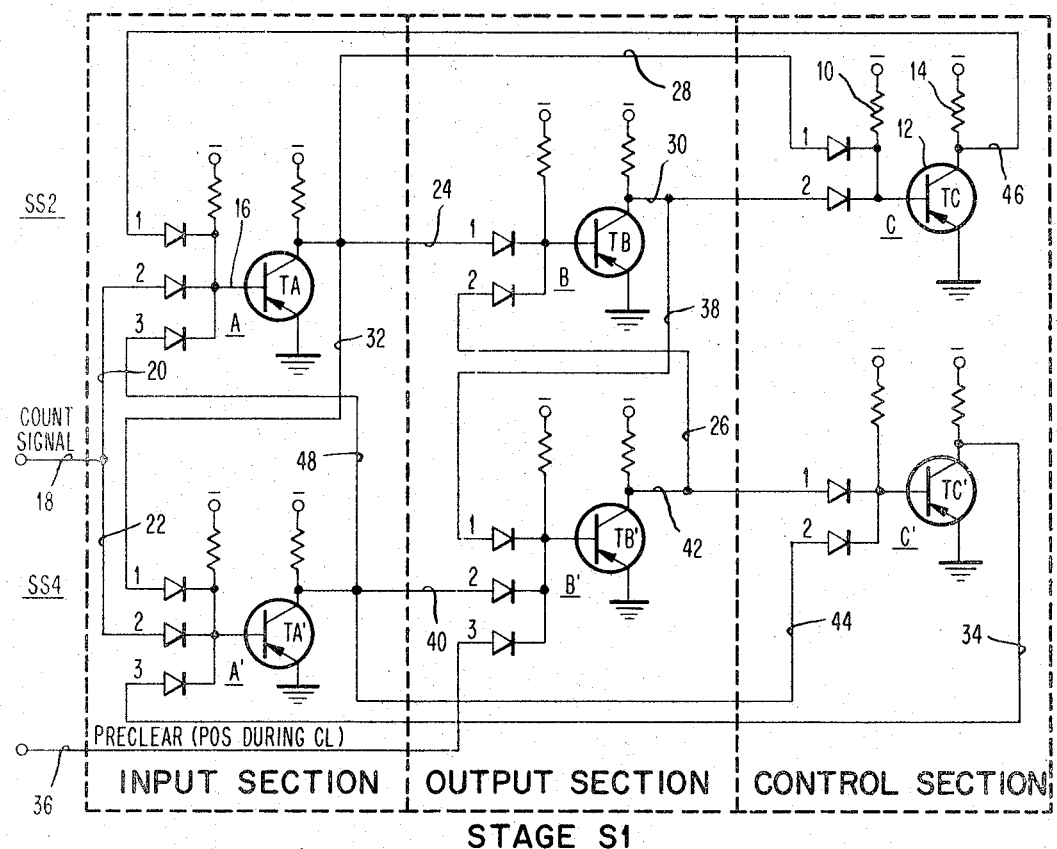

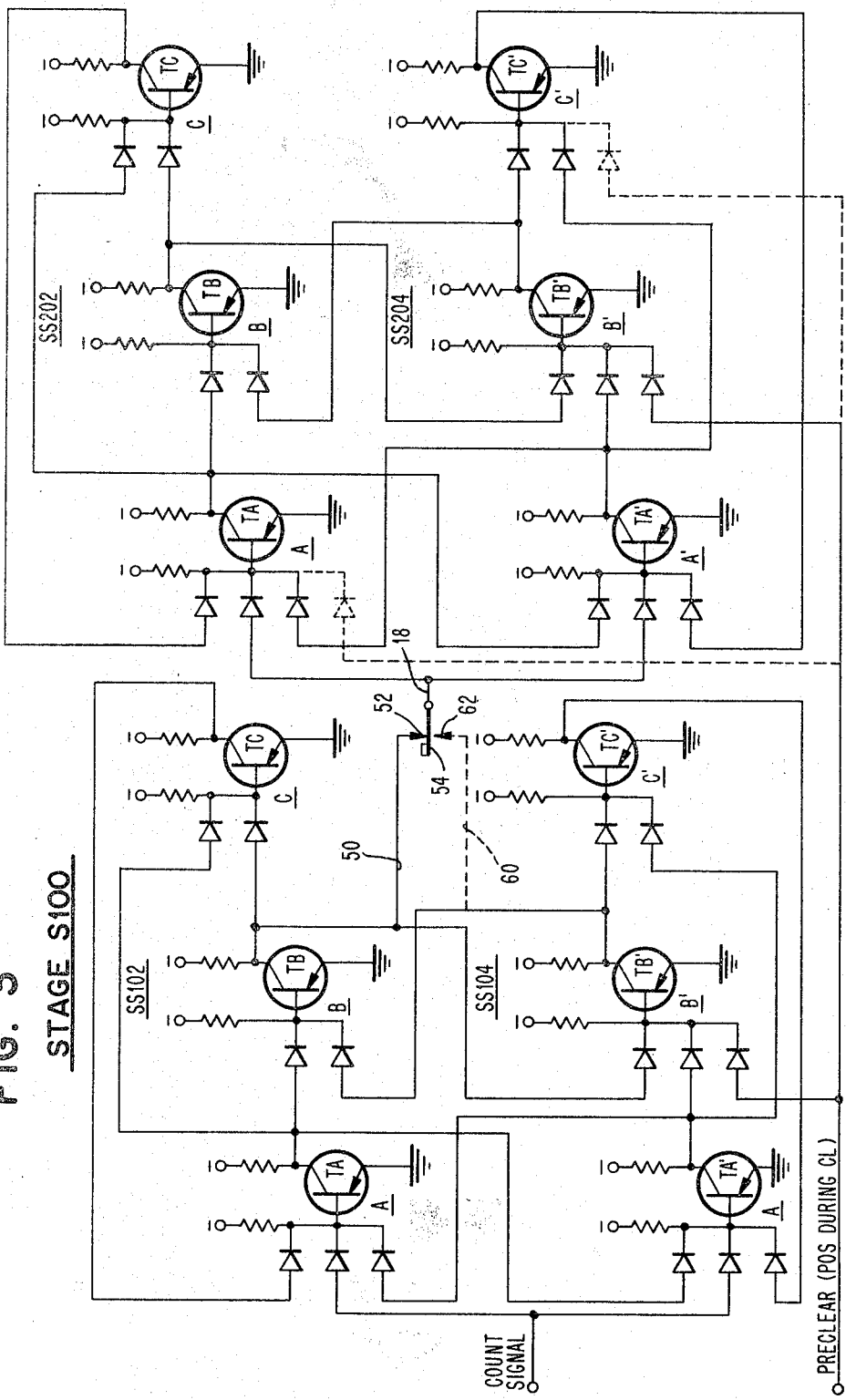

FIG. 4

| GATE COUNT PULSE | OUTPUTS — STAGE S100 | | | | | | OUTPUTS — STAGE S200 | | | | | |
| --- | --- | --- | --- | --- | --- | --- | --- | --- | --- | --- | --- | --- |
| | SS102 | | | SS104 | | | SS202 | | | SS204 | | |
| | A | B | C | A' | B' | C' | A | B | C | A' | B' | C' |
| 0 PRECLEAR APPLIED | − | +/0 | − | − | −/1 | + | − | +/0 | − | − | −/1 | + |
| 1 | + | − | − | − | + | − | + | − | − | − | + | − |
| WHEN COUNT TERMINATES | − | −/1 | + | − | +/0 | − | + | −/1 | − | − | +/0 | − |
| 2 | − | + | − | + | − | − | − | − | + | − | + | − |
| WHEN COUNT TERMINATES | − | +/0 | − | − | −/1 | + | − | −/1 | + | − | +/0 | − |
| 3 | + | − | − | − | + | − | − | + | − | + | − | − |
| WHEN COUNT TERMINATES | − | −/1 | + | − | +/0 | − | − | +/0 | − | + | −/1 | − |
| 4 | − | + | − | + | − | − | − | + | − | − | − | + |
| WHEN COUNT TERMINATES | − | +/0 | − | − | −/1 | + | − | +/0 | − | − | −/1 | + |

FIG. 5

| GATE COUNT PULSE | OUTPUTS — STAGE S100 | | | | | | OUTPUTS — STAGE S200 | | | | | |
| --- | --- | --- | --- | --- | --- | --- | --- | --- | --- | --- | --- | --- |
| | SS102 | | | SS104 | | | SS202 | | | SS204 | | |
| | A | B | C | A' | B' | C' | A | B | C | A' | B' | C' |
| 0 PRECLEAR APPLIED | − | +/0 | − | − | −/1 | + | − | +/0 | − | + | −/1 | − |
| 1 | + | − | − | − | + | − | − | + | − | − | − | + |
| WHEN COUNT TERMINATES | − | −/1 | + | − | +/0 | − | − | +/0 | − | − | −/1 | + |
| 2 | − | + | − | + | − | + | + | − | − | − | + | − |
| WHEN COUNT TERMINATES | − | +/0 | − | − | −/1 | + | + | − | − | − | +/0 | − |
| 3 | + | − | − | − | + | − | − | − | + | − | + | − |
| WHEN COUNT TERMINATES | − | −/1 | + | − | +/0 | − | − | −/1 | + | − | +/0 | − |
| 4 | − | − | + | − | − | − | + | − | + | − | − | − |
| WHEN COUNT TERMINATES | − | +/0 | − | − | −/1 | + | − | +/0 | − | + | −/1 | − |

FIG. 7

| GATE COUNT PULSE | OUTPUTS — STAGE S300 | | | | | | | | |
| --- | --- | --- | --- | --- | --- | --- | --- | --- | --- |
| | SS302 | | | SS304 | | | SS306 | | |
| | A | B | C | A' | B' | C' | A" | B" | C" |
| 0 PRECLEAR APPLIED | − | +/1 | − | − | −/0 | + | − | −/0 | + |
| 1 | + | − | − | − | − | + | − | + | − |
| WHEN COUNT TERMINATES | − | −/0 | + | − | −/0 | + | − | +/1 | − |
| 2 | − | − | + | − | + | − | + | − | − |
| WHEN COUNT TERMINATES | − | −/0 | + | − | +/1 | − | − | −/0 | + |
| 3 | − | + | − | + | − | − | − | − | + |
| WHEN COUNT TERMINATES | − | +/1 | − | − | −/0 | + | − | −/0 | + |

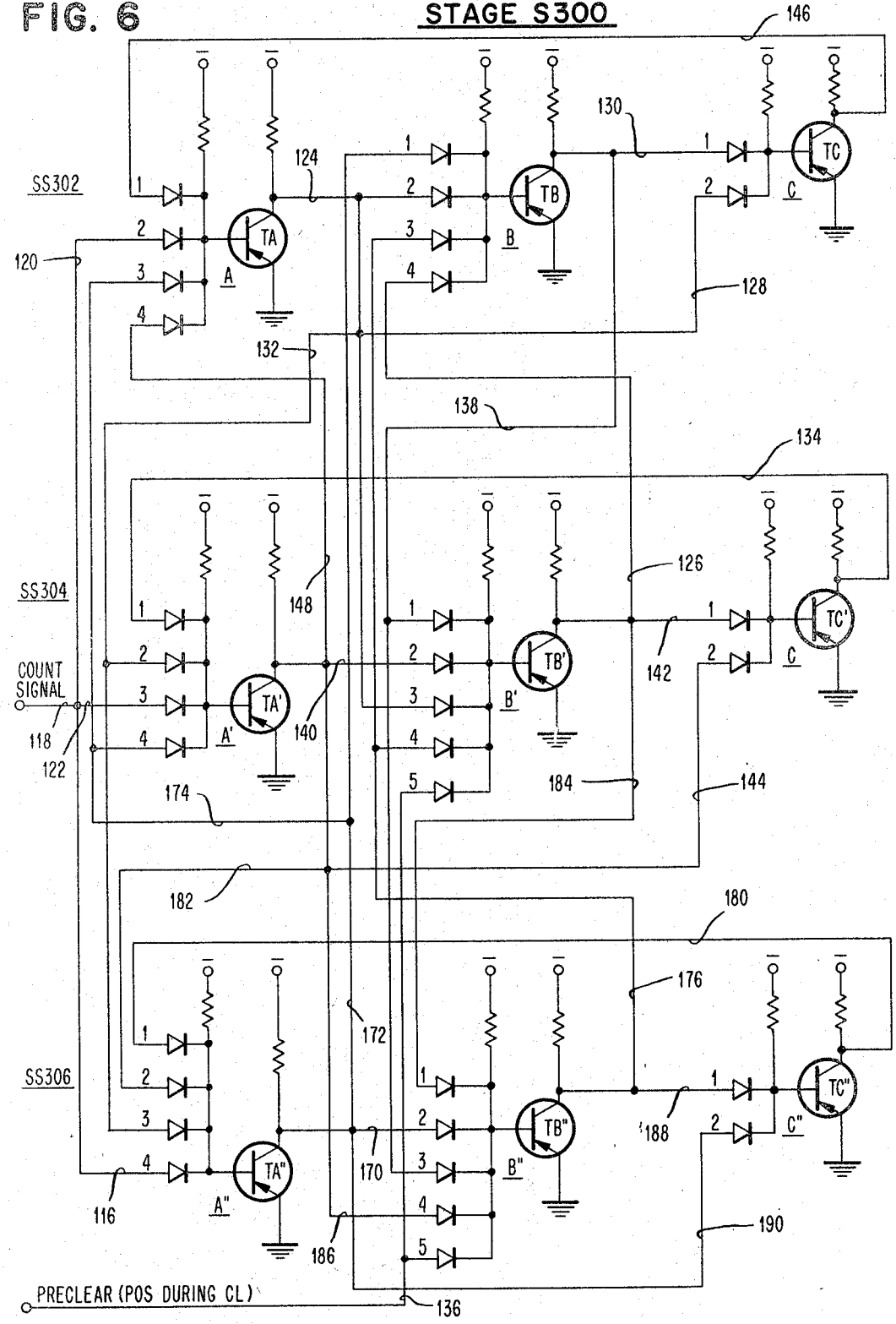
March 21, 1967 G. R. COGAR 3,310,660
ASYNCHRONOUS COUNTING DEVICES
Filed April 23, 1963 8 Sheets-Sheet 4
FIG. 6 STAGE S300

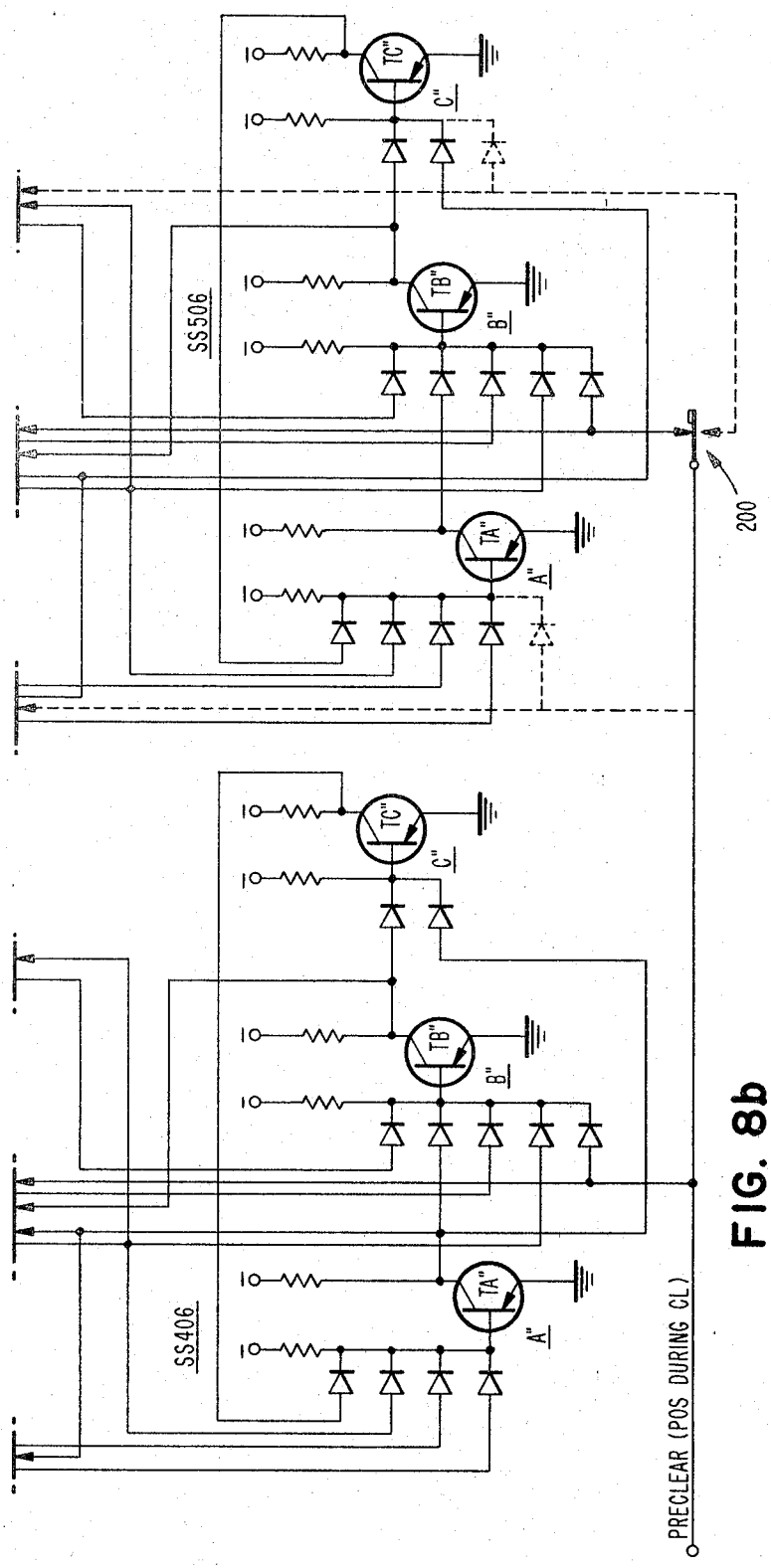

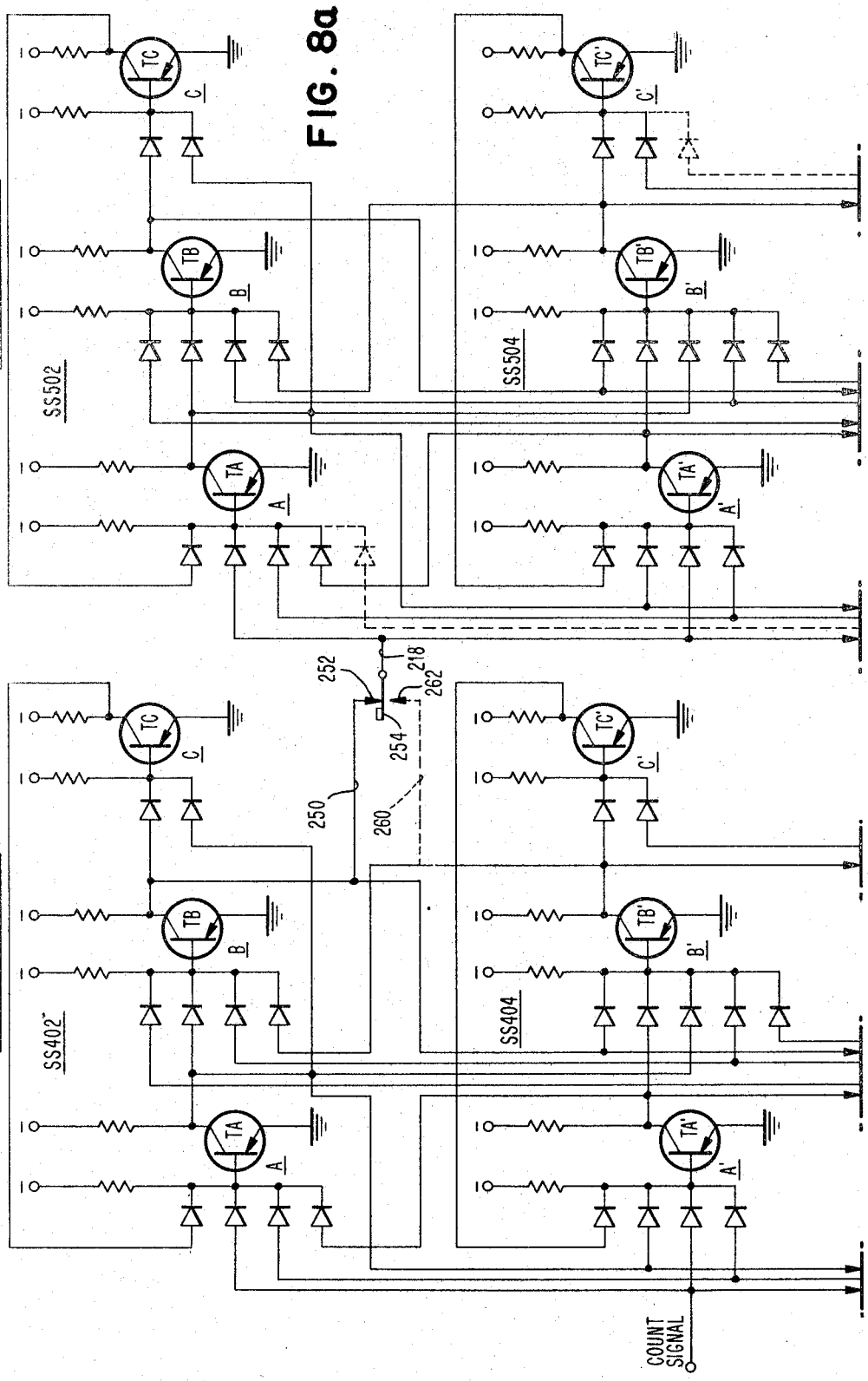

FIG. 9

| COUNT PULSE \ GATE | OUTPUTS ||||||||||||||||
|---|---|---|---|---|---|---|---|---|---|---|---|---|---|---|---|---|
| | STAGE S400 ||||||||| STAGE S500 |||||||
| | SS402 ||| SS404 ||| SS406 ||| SS502 ||| SS504 ||| |||
| | A | B | C | A' | B' | C' | A" | B" | C" | A | B | C | A' | B' | C' | A" | B" | C" |
| 0 PRECLEAR APPLIED | − | +1 | − | − | −0 | + | − | −0 | + | − | +1 | − | − | −0 | + | − | −0 | + |
| 1 | + | − | − | − | − | + | − | + | − | + | − | − | − | − | + | − | + | − |
| WHEN COUNT TERMINATES | − | −0 | + | − | −0 | + | − | +1 | − | + | −0 | − | − | −0 | + | − | +1 | − |
| 2 | − | − | + | − | + | − | + | − | − | + | − | − | − | − | + | − | + | − |
| WHEN COUNT TERMINATES | − | −0 | + | − | +1 | − | − | −0 | + | + | −0 | − | − | −0 | + | − | +1 | − |
| 3 | − | + | − | + | − | − | − | − | + | − | − | + | − | − | + | − | + | − |
| WHEN COUNT TERMINATES | − | +1 | − | − | −0 | + | − | −0 | + | − | −0 | + | − | −0 | + | − | +1 | − |
| 4 | + | − | − | − | − | + | − | − | + | − | − | + | − | + | − | + | − | − |
| WHEN COUNT TERMINATES | − | −0 | + | − | −0 | + | − | +1 | − | − | −0 | + | − | +1 | − | + | −0 | − |
| 5 | − | − | + | − | + | − | + | − | − | − | − | + | − | + | − | + | − | − |
| WHEN COUNT TERMINATES | − | −0 | + | − | +1 | − | − | −0 | + | − | −0 | + | − | +1 | − | + | −0 | − |
| 6 | − | + | − | + | − | − | − | − | + | − | − | + | − | + | − | − | − | + |
| WHEN COUNT TERMINATES | − | +1 | − | − | −0 | + | − | −0 | + | − | −0 | + | − | +1 | − | − | −0 | + |
| 7 | + | − | − | − | − | + | − | − | + | − | + | − | + | − | − | − | − | + |
| WHEN COUNT TERMINATES | − | −0 | + | − | −0 | + | − | +1 | − | − | +1 | − | + | −0 | − | − | −0 | + |
| 8 | − | − | + | − | + | − | + | − | − | − | + | − | + | − | − | − | − | + |
| WHEN COUNT TERMINATES | − | −0 | + | − | +1 | − | − | −0 | + | − | +1 | − | + | −0 | − | − | −0 | + |
| 9 | − | + | − | + | − | − | − | − | + | − | + | − | − | − | + | − | − | + |
| WHEN COUNT TERMINATES | − | +1 | − | − | −0 | + | − | −0 | + | − | +1 | − | − | −0 | + | − | −0 | + |

FIG. 10

| COUNT PULSE \ GATE | OUTPUTS ||||||||||||||||||
|---|---|---|---|---|---|---|---|---|---|---|---|---|---|---|---|---|---|---|
| | STAGE S400 |||||||||STAGE S500 |||||||||
| | SS402 ||| SS404 ||| SS406 ||| SS502 ||| SS504 ||| SS506 |||
| | A | B | C | A' | B' | C' | A | B" | C" | A | B | C | A' | B' | C' | A" | B" | C" |
| 0 PRECLEAR APPLIED | − | +1 | − | − | −0 | + | − | −0 | + | − | +1 | − | + | −0 | − | − | −0 | + |
| 1 | + | − | − | − | − | + | − | + | − | − | + | − | + | − | − | − | − | + |
| WHEN COUNT TERMINATES | − | −0 | + | − | −0 | + | − | +1 | − | − | +1 | − | + | −0 | − | − | −0 | + |
| 2 | − | − | + | − | + | − | + | − | − | − | + | − | − | − | + | − | − | + |
| WHEN COUNT TERMINATES | − | −0 | + | − | +1 | − | − | −0 | + | − | +1 | − | − | −0 | + | − | −0 | + |
| 3 | − | + | − | + | − | − | − | − | + | + | − | − | − | − | + | − | + | − |
| WHEN COUNT TERMINATES | − | +1 | − | − | −0 | + | − | −0 | + | + | −0 | − | − | −0 | + | − | +1 | − |
| 4 | + | − | − | − | + | − | − | − | + | + | − | − | − | − | + | − | + | − |
| WHEN COUNT TERMINATES | − | −0 | + | − | −0 | + | − | +1 | − | + | −0 | − | − | −0 | + | − | +1 | − |
| 5 | − | − | + | − | + | − | + | − | − | − | − | + | − | − | + | − | + | − |
| WHEN COUNT TERMINATES | − | −0 | + | − | +1 | − | − | −0 | + | − | −0 | + | − | −0 | + | − | +1 | − |
| 6 | − | + | − | + | − | − | − | − | + | − | − | + | − | + | − | + | − | − |
| WHEN COUNT TERMINATES | − | +1 | − | − | −0 | + | − | −0 | + | − | −0 | + | − | +1 | − | + | −0 | − |
| 7 | + | − | − | − | − | + | − | − | + | − | − | + | − | + | − | + | − | − |
| WHEN COUNT TERMINATES | − | −0 | + | − | −0 | + | − | +1 | − | − | −0 | + | − | +1 | − | + | −0 | − |
| 8 | − | − | + | − | + | − | + | − | − | − | − | + | − | + | − | − | − | + |
| WHEN COUNT TERMINATES | − | −0 | + | − | +1 | − | − | −0 | + | − | −0 | + | − | +1 | − | − | −0 | + |
| 9 | − | + | − | + | − | − | − | − | + | − | + | − | + | − | − | − | − | + |
| WHEN COUNT TERMINATES | − | +1 | − | − | −0 | + | − | −0 | + | − | +1 | − | + | −0 | − | − | −0 | + |

# United States Patent Office 3,310,660
Patented Mar. 21, 1967

3,310,660
ASYNCHRONOUS COUNTING DEVICES
George R. Cogar, Doylestown, Pa., assignor to Sperry Rand Corporation, Detroit, Mich., a corporation of Delaware
Filed Apr. 23, 1963, Ser. No. 275,000
9 Claims. (Cl. 235—92)

This invention relates to counting systems and more particularly to delay-free asynchronous counting arrangements.

With the wide acceptance and use of electronic computing devices and data processing systems, faster and faster computing devices must be devised to meet the requirements of the ever increasing problem complexity and the problem of reduction and handling of large masses of information. Heretofore, increases in the speed of the overall system or computer operation have come from increasing the speed of operation of the relative parts and components of the data processing system or computer. For example, by increasing the speed of operation of the arithmetic components of the computer, it is possible to increase the overall speed of such a computer. However, certain limitations upon the speed of operation which such devices may attain are inherent in the particular manner of operation which most present computers and data processing systems employ. The procedure employed is that of synchronous operation, that is, the computer operates on a distinct time cycle wherein each particular bit of information and each group of information bits forming a computer word occupies a well-defined time period. The machine is thus limited in its operation to an inflexible repetitive time cycle equal to some multiple of the originally chosen word length or vice versa. Once the particular clock sequence and frequency are chosen, all operations within the computer, such as the transfer of data, arithmetic computation on data and manipulation of data is controlled by the timing selected. Provisions to allow for variations of the timing cycles involve complex equipment and programming techniques. Further, since these time intervals are preset and pre-assigned, they must be arranged to provide for the worst possible conditions which may occur due to individual operations within the machine. Thus, because certain elements within the machine are slow to react, that is, they take a long time to settle down to a stable operating condition, the time period provided must be sufficiently long to allow these slower elements to react. However, during this longer period many of the remaining elements within the computer are already settled to a reliable operating condition long before the slower operating component is ready to produce error-free information. Further, in synchronous operations, each step of the transfer of information from one particular component to the next is controlled by individual clocking pulses. Therefore, if each stage is to be timed according to the worst possible condition which might occur within the computer, then the stages of unnecessary delay are compounded one upon another, thus producing a time sequence which is far slower than that required to operate most of the components within the machine. Consider, the time spent in certain arithmetic operations—for example, the time required to propagate a carry from the lowest order to the highest order. Though this type of carry may rarely occur, sufficient time must nonetheless be allowed for the possibility of this particular carry. This must be done to prevent the loss of this carry, which would produce an incorrect result if not accounted for. Thus, it can be seen that with machines of the synchronous type, a large portion of the timing cycle is wasted to provide for conditions which, although infrequent in their occurrence, must nonetheless be considered, if error-free information is to be obtained. Hence, these systems may not be flexible enough to enable them to meet the needs of the problem presented for solution.

One solution to the foregoing problem, which would permit the more effetcive utilization of the time available for computation and permit more flexible use of time, would be the use of an asynchronous type of computing and data processing device. The asynchronous device, as contrasted with the synchronous device mentioned above, does not require a clock or timing pulse for its operation. Instead the asynchronous device determines each individual operation and the time at which it is to begin depending upon the arrival of all information necessary for the operation. Stated another way, an asynchronous machine depends for its operation upon all necessary inputs being available to a particular stage before that stage will operate. It is generally a level type of machine rather than a pulse type machine; i.e., in an asynchronous machine the signals which are made available in the various stages thereof are as voltage levels rather than short voltage pulses as is frequently found in synchronous types of computing devices. In this manner, the inputs necessary for the operation of a particular stage are available sufficiently long to permit all the necessary inputs to arrive and to be present for operation of the stage. The individual stages of the computer operate as soon as the data required for that particular stage has arrived and there is no need to wait for the arrival of a particular clock pulse which may occur long after the arrival of all necessary input signals. Word lengths and word formats may be varied because of the independence of the information from a rigid clock, thus permitting a more flexible manner of operation.

Briefly stated, the embodiments of the invention described consist of level operating asynchronous counting arrangements which operate independently of clock pulses. Operation of these devices depend solely upon the presence or absence of voltage levels or signals from input sources as well as from certain stages within the device itself. A first embodiment describes an asynchronous counter capable of counting in the modulo two number system. The device consists of two substages, each composed of a number of gates which operate in conjunction with the input signal to control the response of the individual substages to input signals. For example, the first substage may be made responsive to the first input signal to effect a first count. The device in accordance with the levels developed within the first substage permits the second signal to be counted by the second substage and prevents the first substage from responding to such a signal. After receipt of the second signal, the device will prepare the first stage to respond to the next arriving signal to be counted, hereinafter called the count signal. This sequence of steps will continue back and forth between the two substages as each successive count signal arrives.

In a further embodiment, three substages are provided to form an asynchronous counting device counting according to a modulo three numbering system. The internal connections of the various substages permit the device to operate so as to permit the first substage to respond to a first count signal, the second substage to respond to the second count signal and the third substage to respond to the final or third count signal. The device then by its own internal levels controls the recycling of the device to respond to the next group of three pulses. In this manner, the device is free to operate at a speed to be determined by the availability of the output levels of the gates which compose the various substages. The individual stages of the modulo two or modulo three counting devices may then be cascaded to form larger counting chains with proper arrangements made for carrys between the stages, as shown by further embodiments of the device. Further, the embodiments described serve to teach a procedure whereby the systems shown for the modulo two and modulo three counting systems may be extended to include counting systems of any modulo $n$.

It is, therefore, an object of this invention to provide an improved counting device.

It is an object of this invention to provide an improved form of asynchronous counting device.

It is a further object of this invention to provide an improved form of modulo two asynchronous counting device.

It is a further object of this invention to provide an improved form of asynchronous modulo three counting device.

It is yet another object of this invention to provide an improved form of asynchronous counting device operating independent of a clock or timing signal and dependent upon the levels of the signals within said counting device, as well as its input signals.

It is yet another object of this invention to provide a multi-stage asynchronous modulo two counting device capable of operating at increased speed and indepndent of any form of clocking or timing signal source.

It is still a further object of this invention to provide an improved form of multi-stage asynchronous modulo three counting device which operates independent of any clocking or timing signal source and dependent solely upon the signals present within said device, as well as its input signals.

It is still a further object of this invention to provide an N stage asynchronous counting device capable of operating within the modulo N numbering system which operates independent of any clocking or timing signal source and solely dependent upon the signal levels within said device, as well as its input signals.

It is yet another object of this invention to teach a method by which asynchronous counting devices may be constructed to operate in any modulo N numbering system and which operate independent of any timing or clock source and which operate solely dependent upon the signals avaliable within said device, as well as its input signals.

It is still another object of this invention to provide a device capable of handling information without necessity of providing a fixed or rigid clock or timing signal arrangement.

Other objects and features of the invention will be pointed out in the following description and claims and illustrated in the accompanying drawings which disclose by way of example, the principles of the invention and the best modes which have been contemplated for carrying them out.

In the drawings:

FIGURE 1 illustrates a single stage of an asynchronous counting device constructed in accordance with the principles of the invention and arranged to count in a modulo two numbering system;

FIGURE 2 is a table indicating the various section outputs of the device of FIGURE 1;

FIGURE 3 illustrates a multi-stage asynchronous counting device arranged to count in the modulo two numbering system and further illustrates an alternative arrangement of the counting device whereby the output signal pattern of the various stages may be modified;

FIGURE 4 is a table indicating the various section outputs for the device as shown in FIGURE 3 in the first arrangement;

FIGURE 5 is a table indicating the various section outputs for the alternative arrangement of FIGURE 3;

FIGURE 6 illustrates a signal stage of an asynchronous counting device constructed in accordance with the principles of the invention and arranged to count in a modulo three numbering system;

FIGURE 7 is a table indicating the various section outputs of the counting device illustrated in FIGURE 6;

FIGURES 8a and 8b illustrate a multi-stage asynchronous counting device constructed to operate in the modulo three counting system. FIGURES 8a and 8b are to be viewed as shown in FIGURE 8;

FIGURE 9 is a table indicating the various section outputs of the counting device as shown in FIGURES 8a and 8b; and FIGURE 10 is a table indicating the various section outputs of the counting device shown in FIGURES 8a and 8b in its alternative arrangement.

Similar elements are given similar reference characters in each of the drawings.

Referring to FIGURE 1, there is shown a single stage of an asynchronous counting device constructed in accordance with the principles of this invention and arranged to count in the modulo two numbering system. The device consists of two substages SS2 and SS4, respectively, each substage further being composed of a number of individual sections generally described as the input section, the output section and the control section. The input sections of the various substages are designated A, the output sections are designated B and the control sections are designated C. The sections of the first substage SS2 and of the second substage SS4 are distinguished from one another by the use of the prime for all sections of the second substage SS4. Therefore, the input section of the second substage SS4 will be defined as A', the output section as B', and the control section as C'. Each of the sections for the various substages include negative input "And-inverter" gates which produce a positive or high signal at its output if all its inputs are present and negative, whereas a negative or low signal is produced at its output if any of its inputs are positive or high.

More specifically, the operation of the "And-inverter" circuits may be understood by considering the two input "And-inverter" gate C of the control section of substage SS2. As can be seen from FIGURE 1, the inputs are introduced to the anodes to two diodes $C_1$ and $C_2$, arranged as an And gate. The cathodes of diodes $C_1$ and $C_2$ are connected to a common negative bias source via a resistor 10. The And gate output, taken from the cathodes of the diodes $C_1$ and $C_2$, is connected to the base of a PNP transistor 12 which is arranged in a grounded emitter configuration. The output for the gate output is taken from the collector of the transistor 12. The collector of the transistor 12 is also biased negatively through a resistor 14. When negative pulses exceeding the bias voltage are applied to both of the diodes $C_1$ and $C_2$ of the gate C, no current is permitted to flow within the diode arrangement and the voltage presented to the base of the transistor 12 is, neglecting any loss due to the bias resistor 10, the negative value of the bias supply itself. If the value of the negative bias supplied to the collector of the transistor 12 is larger, that is negative with respect to the value of the negative signal now applied to the base of the transistor 12, the transistor 12 will be permitted to conduct thereby providing an output level which is the ground value of the emitter. Assuming that the signals are represented as a zero voltage for a positive signal and a $-3$ volt signal for a negative signal, the production of a zero or ground level at the output of the collector of the transistor 12 is equivalent to production of a one signal. Thus the introduction of two negative inputs has produced a single positive output. The introduction of a single negative and a single positive to the respective diodes $C_1$ and $C_2$ of the gate C will produce the following effects: The positive signal on, for example, diode $C_1$, will cause a current to flow in diode $C_1$ whereby the level of the junction point at the cathodes of the two diodes rises to that of ground or the positive value applied. This positive value will then be applied to the base of the transistor 12 preventing it from conducting. This is due to the fact that the base of the PNP transistor 12 is now positive with respect to the emitter, rather than negative as required for conduction. With the transistor prevented from conducting, the output signal produced is due to the negative bias voltage on the collector of the transistor 12. Thus, for a single positive and a single negative input, a negative signal will be produced. In a similar fashion, if both of the input signals to the diodes $C_1$ and $C_2$ of the gate C were positive, the current permitted to flow through the respective diodes $C_1$ and $C_2$ would produce a positive signal at the base of the transistor 12. Hence, the transistor would not conduct, resulting in the production of a negative output voltage at the collector.

Turning now to FIGURE 1 as a whole it can be seen that gate A of the input section, is constructed of three diodes designated A1, A2, and A3 arranged with their cathodes connected to a resistor and negative bias source. The anodes of the diodes A1, A2 and A3 are arranged to receive input levels according to the input information and control which is necessary for proper operation. The output from the common cathodes of the diodes A1, A2 and A3 are connected by the lead 16 to the base of a PNP transistor TA arranged in a grounded emitter configuration. The collector of the transistor TA is connected through a suitable resistor to a negative bias supply. The diode A1 receives an input which is the output of the transistor 12 of the gate C in its own substage. The diode A2 receives an input from the count signal line 18 via the connecting line 20. The diode A3 receives as an input the output signal of the gate A' in the input section of the second substage.

The B gate of the output section of the first substage is similar in construction to that described with reference to the A gate of the input section but employs only two diodes in the And portion. The inputs to this gate are as follows: diode B1 receives the output of the A gate along the line 24, while the diode B2 receives as its input the output of the B' gate of the output section of substage SS4 along the line 26.

The C gate of the control section of the first substage is composed of two diodes with suitable bias supply and an output transistor arrangement as described with reference to the other gates A and B. The inputs to its diodes C1 and C2 are as follows: diode C1 receives as its input the output of the A gate of the input section of its own substage via the line 28 while the diode C2 receives as its input the output from the B gate of the output section of the same substage via the line 30. Thus, it is obvious that the control gate C receives its inputs based upon the outputs of its own input and output sections and in turn produces an output from its output transistor to supply one of the inputs of the input section gate A. Thus, the ability of the control section gate C to control the input section gate A to respond to count signals will be dependent upon the output of the input section gate A and the output section gate B. In that the inputs to the gates A and B of the substage are also determined by the outputs of the gates A' and B' of the second substage the inputs to the control stage C will be derived depending upon the various available conditions within the entire stage S1 composed of both substage SS2 and SS4. As will be made more clear from the descirption below, the various steps of operation of the asynchronous device will depend upon the input signals available as well as the outputs of the various component gates which compose a particular stage. Further when a plurality of these stages are cascaded, the operation of each stage will depend then upon the component gates within the stage as well as the outputs of the stages before it in the counting device.

The gate A' of the second substage SS4 is similar in construction to the gate A of the first substage SS2. It receives at its diodes A'1, A'2, and A'3 inputs which correspond to: (1) the output of the gate A of the first substage SS2 via line 32; (2) the count input signal from the line 18 via the connecting line 22 and finally; (3) the output of the gate C' which is the control section of the second substage SS4 via line 34.

The B' gate which is the output section gate for the second substage SS4 is similar in construction to the B gate of the first substage SS2 with the addition, however, of a further diode. This additional diode B'3 receives a preclear pulse, via line 36 to allow this gate to be set to an initial condition as will be described below. The preclear pulse will be positive during clearing intervals and will return to a negative value at which it will remain for the entire operation. The diode B'1 is connected via a line 38 to the output of the gate B of the substage SS2. In this manner the diode B'1 receives an input commensurate with the output of the gate B. Diode B'2 is supplied with an input via line 40 from the output of the gate A' of the same substage SS4.

The control section gate C' is similar in construction and arrangement to the gate C of substage SS2. At diode C'1 it receives the output of the B' gate of its own substage via line 42 while at diode C'2 it receives the output of the A' input section gate of its own substage SS4 via the line 44. Thus as was the case with the gate C, the gate C' is made responsive to the output of the input section gate, A' and the output section gate B'. The output of this gate as described above will be conducted along line 34 to the diode A'3 of the gate A' to control the response of this gate to count signals.

The operation of this single stage modulo 2 counting device will now be considered with reference to FIGURES 1 and 2. FIGURE 1 illustrates the construction of the stage, whereas FIGURE 2 describes the output signals available at the various gates of the stage. Input count signals are introduced via line 18 and thence over the lines 20 and 22 to the input gates A and A' of the substages SS2 and SS4, respectively. The count signal is represented as a negative potential on the line 18 for the entire count signal period. At the termination of the count period the line 18 is returned to a positive potential, which persists at all times except the count period. The count signal introduced on the line 18 will then be passed through one or the other of the input gates A or A' depending upon the condition of the control gates C and C' of the respective substages. Due to the manner of interconnection, only one of these control section gates will control its respective associated input gate to respond to the count signal. The other control gate will cause its associated input section to be ineffective to respond to the input signal. During the following input cycle, the gates will reverse their functions so that the input section which was blocked when the first input signal was applied will be allowed to respond to the second input signal whereas that gate which was permitted to respond to the first input signal will be blocked from responding to the second count signal. This alternative arrangement will continue on all subsequent input signals and will cause the first substage SS2 to respond to all odd signals whereas the second substage SS4 will respond to all even count signals in a manner described below.

Prior to the receipt of any count signal on the line 18 the preclear signal will be placed on the line 36. As has been explained above, the preclear line is maintained at a negative potential during all times except the preclear cycle itself. It is during the preclear cycle that the preclear line 36 has placed upon it a positive potential to effect the clearing operation and to place the device in its initial count condition. Assuming now that the device is to be employed in a counting operation, the preclear signal is applied and will cause the following gate outputs to be produced: the positive preclear signal will place a positive signal upon the diode B'3 causing the output of the gate B' to go negative. This will place a negative signal upon the diode C′1 and the diode B2. The count line 18, as was described above is maintained at a positive potential except during the count signal period. Thus a positive input is placed at the diode A2 via line 20 as well as the diode A′2 via the line 22. The inputs to the diode A2 and A′2 will cause the outputs of the gates A and A′ to go negative. The negative output of the gate A will be impressed upon the diode B1, as well as the diode C1. The negative output signal of the gate A′ will be impressed upon the diode B′2 as well as the diode A3. The gate B of the output section of the substage SS2 now has negative inputs on both of its diodes B1 and B2 causing the output of the gate B to go positive. The positive output signal of gate B is impressed upon the diodes C2 and B′1. The positive input to the diode B′1 will not affect the output of the gate B′ in that it is producing a negative output in response to the positive preclear signal on diode B′3. However, the positive output of the gate B upon diode C2 will cause the gate C to produce a negative signal which is carried over the output line 46 to diode A1 of the input section A. The gate C′ has received negative inputs on its diode C′1 from the output of the gate B′ and on its diode C′2 from the output of the gate A′. Thus, the output of gate C′ will be a positive signal which is applied via the line 34 to the input diode A′3. Accordingly, at the end of the application of the preclear signal the outputs of the various gates of substage SS2 are as follows. The gate A output is negative; the output of gate B is positive; the output of gate C is negative, whereas the outputs of the gates of the substage SS4 are as follows: A′ negative; gate B′ negative; gate C′ positive. At the end of the preclear period when the preclear positive signal has been removed, the line 36 will return to a negative value as was described above. This will cause the input to the diode B′3 to go negative but will have no effect as to the output of the gate B′ itself due to the presence of a positive signal on diode B′1 keeping the gate output negative. This state of outputs as described will continue until the application of the first count signal to the line 18.

The outputs of the gates of substages SS2 and SS4 are shown in the table of FIGURE 2, in the first row marked "0 preclear applied." The gate outputs for substage SS2 appear in the columns headed A, B and C, whereas the gate outputs for substage SS4 appear in the columns headed A′, B′ and C′. These output signals are shown for the condition where the preclear signal has terminated and the negative level is returned to the preclear line. The output of the B gate is taken as the stage S1 output to indicate the count condition of the stage S1. A positive output signal will be employed to represent the zero or reset condition of the stage S1. The negative output signal will be employed to represent the one or set condition of the stage S1. These output signals may be detected by means not shown to provide count indications to associated equipment. These detecting means may take the form of gates respectively responsive to the zero or one output signals.

As described above, the count signals are negative signals impressed upon the count signal line 18. The application of the first count signal will place negative signals on the diodes A2 and A′2. The inputs of the gate A are now all negative thus causing the gate to produce a positive output signal. It should be recalled that the gates themselves are constructed in the negative input "And-inverter" logic and will thus produce a positive output if all inputs are present and negative but will produce a negative output if any of its inputs is positive. The positive output of the gate A is introduced via line 24 to the diode B1 and further over the line 32 to the diode A′1. As a result of the introduction of the positive input to the terminal diode B1 the output of the gate B will be changed from positive to negative impressing a negative value on the diodes C2 and B′1. The positive output of the gate A is also conducted via line 28 to the diode C1. The introduction of the negative signal to the diode B′1 will cause all inputs of the gate B′ to be negative and thus produce a positive output at the output of the gate B′ which in turn is impressed on the diode C′1 and the diode B2. The positive input to diode B2 of the gate B will not affect its output and will remain negative. This is due to the positive value already applied to diode B1 by gate A. However, the application of the positive signal to the diode C′1 will cause the output of the gate C′ to go from a positive value to a negative value. The negative output of the gate C′ is applied to the diode A′3. Thus, at the end of the first negative count signal, the gates A, B and C produce outputs which are positive, negative and negative respectively, whereas the gates A′, B′ and C′ produce outputs which are negative, positive and negative respectively. These outputs are shown in the columns A, B, C, A′, B′ and C′ in the row opposite the numeral 1 in FIGURE 2.

In FIGURE 2 the outputs of each of the sections A, B, C of substage SS2 and sections A′, B′, C′ of substage SS4 are arranged in columns for each of the conditions are shown in rows across the columns. In the row titled "When Count Terminates" following the row marked 1 the outputs represent the stable state of the device after the first count signal has been received and the device has settled to its state preparatory to the receipt of a further count signal. By checking the B output it is immediately evident that the device is now in its one count state. The B output being negative, as stated above, indicates the device is in the one or set count condition. It is further possible to determine to count condition of the stage S1, by looking simultaneously at the outputs of both substages SS2 and SS4, that is the outputs of output sections B and B′. It can be seen that the B′ output is positive indicating a zero or reset condition for substage SS4 for the period following the termination of the first count signal. It can further be seen that the output of section B′ was negative after the preclear signal was applied, indicating that substage SS4 was on during the period before the first count signal was applied. Thus if both the outputs B and B′ are detected, the zero condition of the stage S1 may be represented as B=0 and B′=1, whereas the one condition of the stage S1 may be represented as B=1 and B′=0.

Following the application of the negative count signal the count signal line 18 is returned to a positive value and impresses upon the diodes A2 and A′2 its positive level. The application of the positive signal to the diode A2 will cause the output of the gate A to go to a negative value and apply the negative signal to the diodes B1, C1 and A′1. The inputs of the gate C are now both negative causing its output to change to a positive value and impress a positive signal upon the diode A1. Thus, prior to the receipt of the next count signal, the gates A, B, and C are respectively at negative, negative and positive values whereas the gates A′, B′ and C′ remain as they did during the application of the count pulse itself, that is producing negative, positive and negative outputs respectively. It should be understood that a single positive input is sufficient to cause a gate to produce a negative output and that further positive inputs are ineffective to alter the output of such a gate.

If we now compare the outputs of the control gates C and C′, it is obvious that the substage whose control section shows a negative output signal prior to the receipt of a count signal will be the substage which will respond to the next count signal. Thus, prior to the application of the first count signal the control gate C is caused by the preclear signal and the positive level of the count line to produce a negative output signal thus altering the first substage to respond to the first count signal. It can further be seen that the output of the control gate C′ is in the positive state and renders its input section gate A′ unable to respond to the first count signal. It should be noted at this time that the gates employed will effectively be locked out, that is prevented from responding to a particular input signal if any one of its inputs are positive. This is true because a single positive input to a gate will cause the gate to produce a negative output regardless of the other inputs which it receives. Therefore, if the control gate of a particular substage puts positive level upon the associated input gate of that substage this gate is rendered unable to respond to the incoming count signal. On the other hand, the application of a negative signal to a particular input section gate is effective to alert its associated input gate. In this manner, the application of a further signal from a count signal line may determine the output which an input gate will produce. From the table of FIGURE 2 it can be seen that the output of the gate C is positive at the termination of the first count pulse whereas the gate C' is negative. Thus, it appears evident from the table that for the next incoming count signal, the substage SS2 will be blocked effectively by the positive output of the control gate C whereas the input gate A' of the second substage SS4 will be effective to respond to this count signal due to the negative output of its control gate C'. It should also be noted, however, that as a result of the application of the first count pulse the output of the gate C' goes from its positive value blocking the input section of its associated input section to a negative value which apparently would permit the count pulse to pass the input section. However, the output of the gate A connected via the line 32 to the diode A'1 assures that the gate A' will remain locked and unable to respond to the count signal.

The following count signal or second count signal applied to the count signal line 18 causes the impression of a negative signal via the line 20 to the diode A2 and via the line 22 to the diode A'2. The count signal is not permitted to pass through the gate A due to the action of the positive signal on the diode A1 as a result of the output of the control gate C of its own substage. The count signal, however, is permitted to pass the gate A' whose other two inputs, that is the diodes A'1 and A'3 are negative. It is obvious that a positive signal impressed upon the dode of A'2, causes the output of the gate A' to become negative whereas the application of a further negative signal to the gate A'2 would result in the gate producing a positive output. The application of the negative count signal results in the output of the gate A' going positive and applying a positive value signal to the diodes B'2, C'2 and A3. The postive value applied to the diode A3 will be ineffective to change the output of the gate A in that a positive input to the diode A1 is already causing the gate to produce a negative output signal and the gate will not respond to additional positive signals. The application of the positive signal to the diode B'2 causes the gate B' to now produce a negative output signal which is impressed upon the diode C'1. The output of the gate C' will remain negative despite the change in the inputs to the diodes of the gate C' in that the effect of the changes in the outputs of gates A' and B' is merely to interchange the former inputs which existed on the diodes. The negative output of the gate B' is also conducted via the line 26 to the input of diode B2 resulting in the producing of a positive output signal by the gate B. This positive signal is impressed upon the diode C2 as well as the diode B'1. The positive input to the diode B'1 is ineffective to change the output of the gate B' due to the already existing positive signal from the gate A' to its diode B'2. The positive signal from the gate B, however, applied to the diode C2 is effective to change the output of the gate C to a negative value and thus apply a negative signal to the diode A1. Hence, during the interval that the second count signal is applied and after sufficient time has been allowed for various gates to settle down to their stable values the outputs of the gates A, B, and C will be found to be negative, positive and negative respectively whereas the outputs of the gates A', B' and C' will be positive, negative and negative respectively. These outputs are shown in FIGURE 2 in the row headed 2.

When the count signal terminates, a positive value is returned to the line 18 to cause application of a positive value to the diodes A2 and A'2. The positive signal will change the output of the gate A' in that one of the negative inputs has been removed and replaced by a positive signal. The output of the gate A' will become negative and impress a negative voltage upon the diodes B'2, C'2 and A3. The negative output of the gate A' will be effective to change the output of the gate C' from a negative value to a positive value in that both inputs of the gate C' now receive negative input signals. The positive output of the gate C' will be applied to the diode A'3 of gate A'. Thus at the termination of the count pulse and during the positive level period which follows, the gates A, B and C are found to remain in the states in which they existed during the receipt of the second count pulse itself, that is with output values of negative, positive and negative, respectively for the gates A, B and C whereas the gates A', B' and C' now produce outputs which are negative, negative and positive respectively. These outputs are illustrated in FIGURE 2 in the row headed "When Count Terminates" following the row 2. Thus, prior to the receipt of the third input signal the second substage is once more locked out and the first substage is made ready or alerted to respond to the third input count signal. This toggling operation, whereby the first substage is unlocked for all odd signals and the second substage is unlocked for all even signals, will continue for the entire count operation. It will further be observed that the operation of the control section itself is dependent upon the particular outputs of its own input and output section. Thus upon receipt of a count signal by a particular substage, the input and output sections are able to control the control section to prevent response to the following count signal by the same substage, but will permit the other substage to receive said signals. It can further be seen that the input and output sections of both substages are interconnected to sense each other's respective outputs. This aids in the determination of which substage has responded to an input, and permits the lockout-alerting arrangement described. It is due to this internally controlled lockout-alerting arrangement that the device is able to operate at speeds in excess of that which are normally obtainable with synchronous devices. The counting device is permitted to lock and unlock its respective input gates at a rate determined by the availability of inputs and output signals within the device itself. It does not require the use or application of external clocking or timing signals to determine the repetitive rate at which this device may operate. Each gate is permitted to operate as soon as its respective inputs are available. The only requirement for the repetition rate of the input count signals is that it be sufficiently low to permit the device to achieve a stable condition between successive inputs.

FIGURE 3 illustrates the manner in which a number of the stages of FIGURE 1 may be connected together to form a multi-stage modulo 2 counting chain. It is evident from the drawings of FIGURE 3 that the respective stages S100 and S200 are the same as that illustrated with respect to FIGURE 1. The stage S100 receives its input count signals via line 18 as in FIGURE 1. Each succeeding stage as illustrated by stage S200 receives its input from the output section B of the first substage SS102. Thus each time the first substage SS102 produces an output signal, a signal will be transmitted to stage S200 via the line 50. The signal will be passed to the terminal point 52 through the switchblade 54, which is in the upper closed position for the first embodiment depicted, to the input count line 18 of stage S200. For example, when the first count signal arrives, the substage SS102 of stage S100 produces a negative output signal which will result in the setting of substage 202 of stage S200. Hence, for a first input count signal substages SS102 and SS202 of the stages S100 and S200 will assume the one count state. The following count signal will cause the second substage, that is substage SS104 of stage S100 to be in the count position, but substage SS202 of stage S200 will remain in the same count position. The count state of substage 202 is due to the fact that the output signal at the output stage B of substage SS102 of stage S100 is positive during the entire time of the second count pulse and is ineffective to cause the stage S200 to count. Upon the application of the third count signal via the line 18, the substage SS102 of stage S100 would respond to the third count pulse and produce a negative output signal which will cause the stage S200 to also count. The counting operation will continue in this manner whereby each time substage SS102 of stage S100 receives a count signal, a signal will be passed to stage S200 to permit it to count. The counting pattern for this two-stage modulo 2 counting device is illustrated in Table I below whereas the outputs of the various gates are shown in FIGURE 4.

TABLE I

| Count Signal | Stage S200 Outputs | Stage S100 |
| --- | --- | --- |
| 0 | 0 | 0 |
| 1 | 1 | 1 |
| 2 | 1 | 0 |
| 3 | 0 | 1 |
| 4 | 0 | 0 |

The count pattern is such that for the preclear condition stage S100 and stage S200 are placed in the zero condition as illustrated in line 1 of the table. The first count signal will cause the stages S100 and S200 both to take on the one count condition as shown by line 2. Upon the occurrence of the second count signal the first stage S100 is returned to the zero condition whereas the second stage S200 remains in the one condition as shown by line 3. A third input pulse as shown in line 4 causes stage S100 to return to its one condition and the stage S200 to return to the zero condition. The occurrence of the fourth count signal causes both stages S100 and S200 to return to the zero condition. Thus it can be seen from an inspection of Table I that the counting pattern for stage S100 progresses according to the usual binary count pattern, that is, 0 1 0 1. However, the counting pattern for stage S200 does not. The stage S200, as is seen from the table counts 0 1 1 0 rather than the expected pattern of 0 0 1 1. Thus, although four distinct count states exist, considering both stages S100 and S200, the count pattern is not that normally expected of a binary counting device. The counter, of the first embodiment of FIGURE 3, may be used directly in that it provides signals indicative of these four distinct states without any attempt to reconcile the actual count pattern with the usual count pattern for a two stage binary device. The actual count pattern may be reconciled with the usual count pattern by assigning the values 0, 1, 2 and 3 arbitrarily to particular count patterns produced. For example:

TABLE II

| Count Signal | Stage 2 | Stage 1 |
| --- | --- | --- |
| | 2 | 2 |
| 0 | 0 | 0 |
| 1 | 1 | 1 |
| 2 | 1 | 0 |
| 3 | 0 | 1 |

It should be understood, that although only a two stage counting device is illustrated, the device may be extended to any number of stages, each subsequent stage being constructed in the same manner as stage S200, and being connected to the previous stage in the manner of stage S200.

It should be noted that the output signals of stage S100 and S200 as shown in Table I are the outputs of the B gates of substages SS102 and SS202 of stages S100 and S200 respectively. As stated above, the positive signal represents the zero or reset condition whereas the negative signal represents the one or set count condition. Thus, as shown in FIGURE 4, which illustrates the outputs of the gates of the stages S100 and S200, the polarity of the output from the B gates may be readily seen. Further, as indicated above with respect to the single stage device of FIGURE 1, both the B and B′ gates of each stage may be sensed simultaneously to determine the stage output.

In order to permit counting according to the accepted binary counting pattern, a modification of the device as shown in FIGURE 3 may be made. This will permit the device to count according to the normally accepted pattern, as described above. The output signals for the modified device of FIGURE 3 is shown in the table of FIGURE 5. The modification is shown in FIGURE 3 by means of dotted lines. It includes the use of a different output line to conduct input signals to the second and all subsequent stages. The modified output line extends from the output of the B′ gate of substage SS104 of stage S100 rather than the B gate of substage SS102 as was described in the first embodiment. The output line 60 conducts the output of the output gate B′ to a terminal 62 which may alternatively be connected to the switch blade 54 to conduct input signals to the line 18 of the second and all subsequent stages. In addition, each stage beyond the first will be modified by the addition of two diodes, a first, diode A4, is added to the A gate of each subsequent stage. In addition, a further diode, C′3, is added to the control section of each subsequent stage. These gates are effective during the preclear operation to set up an initial signal pattern different than that which is achieved in the first stage. In this manner the counting pattern of all subsequent stages beyond the first may be caused to count according to the accepted binary pattern and thus produce a recognizable count.

As a result of the application of the positive preclear signal to the stages of the device, the first stage S100 will take on a pattern similar to that described with reference to FIGURE 4. The second stage, S200, however, will take on a modified output pattern as illustrated in the FIGURE 5 which describes the outputs of the various gates of stages S100 and S200 in this modified arrangement. The positive preclear signal will insure that the outputs of the gates A, B′ and C′ of stage S200 are negative. Thus the inputs to gate A′ of stage S200 are all negative causing the production of a positive output. The inputs of gate A′ are as follows, diode A′1 has a negative input due to the negative output of gate A of stage S200, diode A′2 receives the negative output of gate B′ of stage S100 and diode A′3 receives the negative output of gate C′ of stage S200. The positive output of gate A′ of stage S200 is applied to diode A3 of stage S200 to control gate A to produce a negative output. As a result of the application of the first input signal to stage S100 of the device a positive output will be generated by the gate B′ of stage S100 and applied to the count signal line 18 of stage S200. This signal, however, will be ineffective to operate the substages of stage S200, in that the positive signal applied to the diode A3, of the gate A by gate A′ of stage S200 prevents the device from responding to the input signal. Further, the positive signal applied to the diode A′2 will cause the gate A′ to go to a negative value and apply negative signals to the diode B′2. This, however, will not change the output of gate B′ and stage S200 will remain in the 0 count condition. This condition is indicated by the outputs of the gates B of stage S100 and stage S200, which respectively produce positive outputs indicative of the zero count. Upon receipt of a second input pulse by the count signal line 18, the count device is placed in the condition in which substage SS104 of stage S100 is made to count and produces an output signal from its output section B' over the line 60 to cause the second stage S200 of the device to count. The third input pulse will cause the first stage S100 to return to the substage SS102 conducting and will not effect the stage S200 at all. When the fourth counting pulse arrives, it causes the substage SS104 of stage S100 to again conduct, an output will be produced which will effect the second stage S200. Therefore, normal manner of counting is achieved, that is, that both stages will be placed in the zero condition by the preclear signal. The first input pulse will effect only the first stage S100, leaving the second stage S200 at zero, the second pulse, at which time the first stage S100 is returned to the zero value, will cause the second stage S200 to be placed in the one value; the third pulse will cause both stages S100 and S200 to be placed in their one value states and finally, the fourth pulse will cause both stages to be returned to the zero condition. Thus, with the modification of the device it is possible to make the count pattern produced that which is normally acceptable for binary counting. Further, the count condition of the device may also be determined by sensing the outputs of the B and B' gates of each stage. Thus the zero count may be indicated by the positive output of gate B and the negative output of gate B' which together represent the zero count state of 0 1. The one count may be represented as 1 0 by the negative and positive outputs of gates B and B' respectively. FIGURES 4 and 5 illustrate the outputs of the gates in the counting device in the unmodified and modified condition respectively. A comparison of the two tables shows as for stage S100 the counting pattern is the same in both embodiments. The counting pattern, however, for stage S200 has been modified as shown in FIGURE 5 as a result of the additional preclear diodes and a different output position of stage S100 used to supply input signals to stage S200. It should be understood that as many stages as is desired may be employed, each subsequent stage constructed and connected as stage 2 of the counting device illustrated. The Table III indicates the count pattern achieved by means of the modification:

TABLE III

| Count Signal | Stage S200 | Stage S100 |
| --- | --- | --- |
| 0 | 0 | 0 |
| 1 | 0 | 1 |
| 2 | 1 | 0 |
| 3 | 1 | 1 |
| 4 | 0 | 0 |

Employing the principles taught with reference to the modulo 2 counting stage of FIGURE 1 a device for counting in a modulo 3 number system may be readily constructed. Reference is now made to FIGURE 6 where is illustrated a single stage of a modulo 3 counting arrangement constructed in accordance with the principles of this invention taken in conjunction with FIGURE 7 which illustrates the outputs of the various gates of the device. As can be seen from FIGURE 6, there are three substages, SS302, SS304 and SS306 which represent the first, second and third substages of the stage shown. Each of the substages is constructed in three sections as was the substage of FIGURE 1. The first section of each of the substages consists of a gate A which operates as the input section; the second section is known as the output section and consists of a gate B and the final section is a control section consisting of a gate C. The gates of the substage SS302 are designated A, B and C whereas the gates of the substage SS304 are designated A', B' and C' and finally, the gates of the substage SS306 are designated A", B" and C". Each of the gates are constructed in a manner similar to that described with reference to FIGURE 1, namely a plurality of diodes capable of accepting input and control signals as will be described below at their anode connections. The cathodes of the gate diodes are connected in common through a resistance to a negative supply. The cathodes are further connected to the base of a PNP transistor connected in a grounded emitter configuration with the collector connected via a resistor to a negative bias supply. The output from each of the various gates is taken from the collector of the gate transistor. The relative values of the bias voltages for the cathodes of the diodes and the collector of the transistor are again chosen so that the bias of the collector of the transistor is positive with respect to the bias of the cathodes of the diodes of each of the gates. The gates again also of the negative input "And-inverter" type which produce positive outputs if all inputs are present and negative or a positive output if any input is positive.

The gate A receives at diode A1 the output of the gate C of the substage SS302 via line 146, that is its associated control gate. Diode A2 is supplied with inputs from the count signal line 8 via the line 120. Diode A3 receives as an input the output of the gate A" via lines 170, 172 and 174. Finally, the diode A4 receives as its input the output of the gate A' via line 148. Gate B receives at diode B1 the output of gate A" via lines 170 and 172; at diode B2 the output of gate A via line 132; at diode B3, the output of gate B" via line 176; and at diode B4 the output of gate B' via line 126. The gate C receives as its inputs, at diode C1 the output of gate B via line 130 and at C2 the output of the gate A via line 128. As before, the gate C is made responsive to the input and output sections of its associated substage.

The gate A' receives as its A'1 diode the output of the gate C' via line 134; at diode A'2 it receives the output of gate A via line 132; at diode A'3 is impressed the count signal from the count signal line 8 via the line 122 and the diode A'4 receives the output of the gate A" via lines 170, 172 and 174. Gate B' receives at diode B'1 the output of gate B via lines 130 and 138; at diode B'2 the output of the gate A' via line 140; at diode B'3 the output of the gate A via lines 124 and 178; at diode B'4 the output of the gate B" via line 176 and at diode B'5 the preclear pulse over the line 136. The gate C' has the following inputs at its respective diodes: at diode C'1: the output of the gate B' via line 142 and at diode C'2 the output of the gate A' via line 144.

Turning now to substage SS306 gate A", receives at diode A"1 the output of the gate C" via line 180 at diode A"2 the output of the gate A' via line 182; at diode A"3 the output of gate A via line 132, and at diode A"4 the count signal from the count signal line 8 via the line 116. Gate B" receives at diode B"1 the output of the gate B' via line 184; at diode B"2 the output of gate A" via line 170; at diode B"3 the output of gate B via line 138; at diode B"4 is received the output of the gate A' via line 186 and at diode B"5 the preclear signal on the line 136. Finally, the control gate C" of the substage SS306 receives at diode C"1 the output of the gate B" via line 188 and at diode C"2 the output of the gate A" via lines 170 and 190.

Thus, it can be seen that the control gate of each stage is made directly responsive to the conditions of the input and output sections of their respective substages and will produce a signal which is fed to its associated input section to control the response of the input section to count signals. The preclear signal on the line 136 operates in a manner as described with reference to FIGURE 1, namely, the line is made positive during the preclear period and is negative at all other times. Further, count signals on the count signal line are negative during the time the count signal is suplied and positive at all other times. The table of FIGURE 7 fully describes the manner of operation of the modulo 3 counting device of FIGURE 6. The outputs of the gates B′ of substage SS304 and B″ of substage SS306 are employed to produce the output indications for the stage. The reason for the use of the outputs of two gates rather than one as in preceding embodiments is that one gate output can only indicate a maximum of two conditions whereas two gate outputs can indicate a maximum of four conditions. Thus two gate outputs are required to indicate the three possible count states of the modulo 3 count device of FIGURE 6. The 00 outputs of gates B′ and B″ are employed to represent the count of zero. The 01 outputs of gates B′ and B″ are used to represent the count of one and the 10 outputs of these gates are used as the two count value. It should also be noted that with respect to the modulo 3 count device a positive output will indicate a one whereas a negative output will represent a zero. Thus the count pattern as shown in FIGURE 7 is 00, 01, 10 and 00 for the clear, 1, 2, and 3 count signals.

It should also be noted that the count state of the device may also be determined by use of a single output from the counter with more involved readout sensing devices. If a positive output is the only one searched for and sampling gates are provided to determine for which substage the positive signal originated the count state of the device may readily be determined. As can be seen from the table of FIGURE 7, gate B of substage SS302 is the only output gate to produce a positive output as a result of the preclear signal or in the period when the 3rd count signal terminates. Thus this output may indicate the zero count state. Gate B″ of substage SS306 produces a positive output as a result of the termination of the first count signal, thus its output may represent the one count condition. Finally gate B′ of substage SS304 produces a positive output as a result of the termination of the second count pulse and its output may be used to represent the second count state. Thus if each of the gates B, B′ and B″ were connected to individual sensing gates, which were tested by three discrete sampling signals, it could be determined what the count state was depending upon which sampling signal caused a signal to be passed through a sensing gate. Thus with more complex readout procedures, a single substage can be used to indicate the count state of the device regardless of the number of substages. Further it is evident that the count state can readily be determined by testing one less than the number of output gates available in a state, i.e. one output gate for a modulo 2 counting device and two output gates for a modulo 3 counting device. Additionally, all three output gate signals may also be used to indicate the count condition of the modulo 3 counting device by assigning certain output patterns arbitrary values. Thus the outputs of gates B, B′ and B″ of 100 may be assigned the zero value, outputs of 001 the one value and outputs of 010 the two value. The second count signal causes gates B and B″ of substages 102 and 106 to produce a negative signal and B″ a positive output.

Again, it can be seen, as was true of FIGURE 1, that the stage whose control gate C produces a negative output prior to the count pulse will receive the next count signal. This is due to the operation of the gate in which a negative signal operates as an alerting signal, and the positive signal prohibits a gate from responding to a signal. As it will be recalled, the reason for this is that the positive outputs of the control gates will cause the input gates to produce negative outputs regardless of the type of signal impressed upon them by the count line. However, the single gate which receives the negative value from its control gate is not so prohibited and its output will be determined by the count signal impressed upon it from the input line 118. The entire operation of the device is similar to that with reference to FIGURES 1 and 2 and is summarized in the table of FIGURE 7. Hence the operation will not be described in further detail.

As was described with reference to FIGURES 3, 4 and 5, the industrial stages as shown in the FIGURE 6 may be combined to produce a multi-stage asynchronous counting device operating in a modulo 3 numbering system. FIGURE 8 depicts a two-stage modulo 3 counting arrangement. A first embodiment of the device which is a mere combination of two substages as shown in FIGURE 6 is depicted entirely in solid lines. An alternative arrangement of the device of FIGURE 8 which will count according to normally accepted modulo 3 numbering system is also shown in FIGURE 8 by means of additional components and signal transfer lines as indicated by the dashed lines and diodes. The table of FIGURE 9 describes in detail the manner of operation of the first embodiment of the FIGURE 8 whereas the table of FIGURE 10 describes the second arrangement or that arrangement shown with the additional components. As was described in detail with reference to the combination of two modulo 2 stages the counting arrangement provided thereby does not count according to the normal modulo 3 counting arrangement, thus producing some variants to that normally accepted. The counting output is shown in pattern Table IV below.

Table of outputs for the substages of the first embodiment of FIGURE 8.

TABLE IV

| Count Signal | Stage S800 | Stage S400 |
| --- | --- | --- |
| 0 | 0 | 0 |
| 1 | 1 | 1 |
| 2 | 1 | 2 |
| 3 | 1 | 0 |
| 4 | 2 | 1 |
| 5 | 2 | 2 |
| 6 | 2 | 0 |
| 7 | 0 | 1 |
| 8 | 0 | 2 |
| 9 | 0 | 0 |

The above output pattern may be determined from an examination of the output gates B′ and B″ of stages S400 and S500. The 00 outputs are indicative of the zero state, the 01 outputs indicate the one state and the 10 outputs indicate the two state as was described with reference to FIGURE 7. As can be seen from the table of FIGURE 9, stage S400 indicates a normal counting pattern of 0, 1, 2; 0, 1, 2; 0, 1, 2; however, stage S500 indicates a variation from the accepted pattern in that it counts 0, 1, 1; 2, 2, 2; 0, 0, 0. In this first embodiment, the count signals for the second and all further stages are provided by the output of the output stage B of stage SS402 of stage S400 via line 250 terminal 252, switchblade 254 in the right contact position and line 218. Thus, each time the counting sequence has caused the first substage SS402 to produce in a negative output signal at the gate B a signal will be presented to the second stage S500 to cause its counting. Thus, in that the first substage SS402 receives the first count pulse both substage SS402 of the first stage S400 and substage SS502 of the second stage S500 will be caused to count, causing an incorrect count when tested in view of the accepted manner of counting in modulo 3 numbering systems.

It should be understood that the nine distinct inputs of the counting device of the first embodiment of FIGURE 8 may be used directly or arbitrarily assigned values to permit a reconciliation between the actual outputs and the desired outputs as was described with reference to FIGURES 3 and 4. Also the sensing gate arrangement described with reference to FIGURES 6 and 7 may also be employed to test for a positive output value. The complete table of operation of this device is shown in FIGURE 9.

By a slight modification of the input arrangement for all subsequent count stages beyond the first as shown in FIGURE 8, the device of the first embodiment may be made to count according to the normally accepted modulo 3 counting system. These modifications include a change of the input line for all stages beyond the first whereby the input is taken from the output of gate B' of the second substage SS504. This output is fed via line 260 terminal 262, the switchblade 254 in its leftmost position to the count line 218 of stage 2 and all following stages. The second substage and all subsequent stages have removed from them the diodes B'5 and B''5 which are normally connected to the preclear line 136. The switch 200 is conveniently provided to permit the disconnecting of the diodes B'5 and B''5 from the preclear line for this purpose. In addition, a diode A5 is added to the gate A of the substage SS402, as well as a diode A''5 added to the gate A''. Both of these diodes receive the preclear signal. In addition, the gate C' is extended to three diodes by the addition of a diode C'3 also connected at a preclear line. Under this condition, as in the modification described with reference to FIGURES 6 and 7, the second and all subsequent substages are prevented from counting in response to the first signal provided to the counter, and permit the subsequent stages to count only once the preceding stage has completed a full cycle of count and has produced an output. Thus, each time the counter arrives at the first substage after the first traversal of a full count cycle, a signal will be issued to the count signal line 218 of the subsequent substages to permit them to count.

The count pattern for the modified embodiment of FIGURE 8 is described in Table V.

TABLE V

| Count Signal | Stage 2 | Stage 1 |
| --- | --- | --- |
|   | 3 | 3 |
| 0 | 0 | 0 |
| 1 | 0 | 1 |
| 2 | 0 | 2 |
| 3 | 1 | 0 |
| 4 | 1 | 1 |
| 5 | 1 | 2 |
| 6 | 2 | 0 |
| 7 | 2 | 1 |
| 8 | 2 | 2 |
| 9 | 0 | 0 |

These outputs represent the outputs of gates B' and B'' of stages S400 and S500 as described with reference to FIGURE 9. The manner of operation of the device is similar to that described with reference to FIGURE 6 and is fully described with reference to FIGURE 10.

While only modulo 2 and modulo 3 single and multiple stage counting devices are illustrated and described, it would be obvious to one skilled in the art how the basic teachings of the invention may be extended to any modulo system for single count devices or multi-stage devices. Futrher, it is understood that the multi-stage devices may be made to contain as many stages as are necessary for the particular use to which the device is to be put.

The embodiments of the invention in which an exclusive property or privilege is claimed are defined as follows:

1. An asynchronous counting device capable of counting according to a modulo three number system comprising: a first, a second and a third substage, each substage arranged to register a distinct one of the numbers of said modulo three number system, each of said first, second and third substages further comprising an input section adapted to receive count pulses, an output section for providing an output signal in accordance with the count pulses received by said input section and a control section; three first means, each connecting the control section of a single substage to the input section of the same substage, to permit said control stage to control the receipt of count pulses by said input section, a plurality of second means, each connecting the input and output sections of a single substage to the control section of the same substage to actuate said control section in response to the condition of said input and output sections at the termination of a count pulse; three third means, each interconnecting the input section of a single substage to the output section of the same substage; and a plurality of fourth means interconnecting said input and output sections of all three of said substages to permit the receipt of said counting pulses by said substages in a predetermined sequence.

2. A device as claimed in claim 1, further comprising means to place said counting device in an initial condition prior to the receipt of count pulses.

3. An asynchronous counting device capable of counting according to a modulo three number system comprising: a first, second and a third substage, each of said first, second and third substages comprising an input section adapted to receive count pulses, an output section for providing an output signal in accordance with the count pulses received by said input section and a control section; three first means, each connecting the control section of a single substage to the input section of the same substage, to permit said control stage to control the receipt of count pulses by said input section, a plurality of second means, each connecting the input and output sections of a single substage to the control section of the same substage to actuate said control section in response to the condition of said input and output sections at the termination of a count pulse; three third means, each interconnecting the input section of a single substage to the output section of the same substage; a plurality of fourth means interconnecting said input and output sections of all three of said substages to permit the receipt of said counting pulses by said substages in a predetermined sequence; and output means connected to two of the output sections of said first, second and third substages to produce a signal indicative of the count in said counting device.

4. An asynchronous counting device capable of counting according to a modulo three number system comprising: a first, second and third substage, each of said three further comprising an input section adapted to receive count pulses in a sequential manner from a common count source, an output section for providing an output signal in accordance with the count pulses received by said input section and a control section for controlling the receipt of count pulses by said input section; a plurality of first means, each connecting the control section of a single substage to the input section of the same substage to permit said control section to alert said input section and permit said input section to receive and count said count pulses, only one of said input sections being alerted to receive a count pulse at any count pulse time; a plurality of second means, each connecting the input and output sections of a single substage to the control section of the same substage to actuate said control section in response to the condition of said input and output sections at the termination of a count pulse; a plurality of third means, each interconnecting the input section of a single substage to the output section of the same substage to cause said output section to produce an output signal upon receipt by said input section of a count pulse; presetting means connected to said output sections of said second and third substages to cause said output section to actuate its associated control section to prevent receipt by the input sections of said second and third substages of the first count pulse and actuate said control section of said first substage to permit receipt of said first count pulse by said input section of said first substage; and a plurality of fourth means each interconnecting a single output section with all of the remaining output sections of the substages, to pass the output signal of said single output section to said remaining output sections as well as to its associated control section via said second means, to cause the control section of the next sequential substage to alert its associated input section and to cause all other control sections to prevent the receipt of the next count pulse by all other input sections, said alerting and preventing sequence continuing through said first, second and third substages for said first, second and third counting pulses and then repeating for each successive group of three count pulses.

5. An asynchronous counting device capable of counting according to a modulo three number system comprising: a first, second and third substage, each of said three substages comprising an input section adapted to receive count pulses in a sequential manner from a common count source, an output section for providing an output signal in accordance with the count pulses received by said input section and a control section for controlling the receipt of count pulses by said input section; a plurality of first means, each connecting the control section of a single substage to the input section of the same substage to permit said control section to alert said input section and permit said input section to receive and count said count pulses only one of said input sections being alerted to receive a count pulse at any count pulse time; a plurality of second means, each connecting the input and output sections of a single substage to the control section of the same substage to actuate said control section in response to the condition of said input and output sections at the termination of a count pulse; a plurality of third means, each interconnecting the input section of a single substage to the output section of the same substage to cause said output section to produce an output signal upon receipt by said input section of a count pulse; presetting means connected to said output sections of said second and third substages to cause said output section to actuate its associated control section to prevent receipt by the input sections of said second and third substages of the first count pulse and actuate said control section of said first substage to permit receipt of said first count pulse by said input section of said first substage; a plurality of fourth means each interconnecting a single output section with all of the remaining output sections of the substages, to pass the output signal of said single output section to said remaining output sections as well as to its associated control section via said second means, to cause the control section of the next sequential substage to alert its associated input section and to cause all other control sections to prevent the receipt of the next count pulse by all other input sections, said alerting and preventing sequence continuing through said first, second and third substages for said first, second and third counting pulses and then repeating for each successive group of three count pulses; and output means connected to two of the output sections of said first, second and third substages to produce a signal indicative of the count in said counting devices.

6. A multi-stage asynchronous counting device capable of counting according to a modulo three number system comprising: a plurality of counting stages, each stage registering the counts within a distinct order of said number system, each of said stages composed of a first, second and third substage, each substage arranged to register a distinct one of the numbers of said modulo three number system, each of said substages further comprising an input section adapted to receive count pulses in a sequential manner from a common count line, an output section for producing an output signal in accordance with the count pulses received by said input section and a control section for controlling the receipt of count pulses by said input section; a plurality of first means, each connecting the control section of a single substage to the input section of the same substage to permit said control section to alert said input section and permit said input section to receive and count said count pulses, only one of said input sections being alerted to receive a count pulse at any count pulse time; a plurality of second means, each connecting the input and output sections of a single substage to the control section of the same substage to actuate said control section in response to the condition of said input and output sections at the termination of a count pulse; a plurality of third means, each interconnecting the input section of a single substage to the output section of the same substage to cause said output section to produce an output signal upon receipt by said input section of a count pulse; a plurality of fourth means each interconnecting said input and output sections of the substages of a single stage to permit the receipt of said counting pulses by said first, second and third substages in a predetermined sequence; a plurality of fifth means each connecting a predetermined output section of one of said substages of a stage to the common count line of the following stage; a sixth means connecting the common count line of the first stage to a source of count pulses, whereby said first stage receives count pulses and each succeeding stage receives a pulse each time the previous stage receives three pulses; and presetting means connected to each stage of said counting device to place said counting device in an initial condition prior to the receipt of count pulses.

7. A multi-stage asynchronous counting device capable of counting according to a modulo three number system comprising: a plurality of counting stages, each stage registering the counts within a distinct order of said number system, each of said stages composed of a first, second and third substage, each of said substages comprising an input section adapted to receive count pulses in a sequential manner from a common count line, an output section for producing an output signal in accordance with the count pulses received by said input section and a control section for controlling the receipt of count pulses by said input section; a plurality of first means, each connecting the control section of a single substage to the input section of the same substage to permit said control section to alert said input section and permit said input section to receive and count said count pulses, only one of said input sections being alerted to receive a count pulse at any count pulse time; a plurality of second means, each connecting the input and output sections of a single substage to the control section of the same substage to actuate said control section in response to the condition of said input and output sections at the termination of a count pulse; a plurality of third means, each interconnecting the input section of a single substage to the output section of the same substage to cause said output section to produce an output signal upon receipt by said input section of a count pulse; a plurality of fourth means each interconnecting said input and output sections of the substages of a single stage to permit the receipt of said counting pulses by said first, second and third substages in a predetermined sequence; a plurality of fifth means each connecting a predetermined output section of one of said substages of a stage to the common count line of the following stage; a sixth means connecting the common count line of the first stage to a source of count pulses, whereby said first stage receives count pulses and each succeeding stage receives a pulse each time the previous stage receives three pulses; presetting means connected to each stage of said counting device to place said counting device in an initial condition prior to the receipt of count pulses; and a plurality of output means, each connected to two of the output sections of said first, second and third substages of each stage to produce a signal indicative of the count in said counting device.

8. A multi-stage asynchronous counting device capable of counting according to a modulo three number system comprising: a plurality of counting stages, each stage registering the counts within a distinct order of said number system, each of said stages composed of a first, second and third substage, each substage arranged to register a distinct one of the numbers of said modulo three number system, each of said substages further comprising an input section adapted to receive count pulses in a sequential manner from a common count line, an output section for producing an output signal in accordance with the count pulses received by said input section and a control section for controlling the receipt of count pulses by said input section; a plurality of first means, each connecting the control section of a single substage to the input section of the same substage to permit said control section to alert said input section and permit said input section to receive and count said count pulses, only one of said input sections being alerted to receive a count pulse at any count pulse time; a plurality of second means, each connecting the input and output sections of a single substage to the control section of the same substage to actuate said control section in response to the condition of said input and output sections at the termination of a count pulse, a plurality of third means, each interconnecting the input section of a single substage to the output section of the same substage to cause said output section to produce an output signal upon receipt by said input section of a count pulse; presetting means connected to the output sections of said second and third substages of each stage to permit said first substage to receive the first count pulse; a plurality of fourth means each connecting the output sections of the substages of a single stage, to permit the passage of the output signal produced by the output section of said first stage, as a result of the receipt of the first count pulse by the input section of said first stage, to said second and third substages to permit said second substage to receive the second count pulse and prevent said third substage from receiving said second count pulse; said output of said output section of said first substage in response to said first count pulse further being passed via said second means to the control section of said first substage to prevent said input section of said first substage from receiving said second count pulse; a plurality of fifth means each connecting the output sections of the substages of a single stage to permit the passage of the output signal produced by the output section of said second substage, as a result of the receipt of said second count pulse by the input section of said second substage, to said first and third substages to permit said third substage to receive the third count pulse and to prevent said first substage from receiving said third count pulse; said output of said output section of said second substage, as a result of the receipt of said second count pulse, further being passed via said second means to the control section of said second substage to prevent the receipt by said input section of said second substage of said third count pulse; a plurality of sixth means each connecting the output sections of the substages of a single stage to permit the passage of the output signal produced by the output section of said third substage as a result of the receipt of said third count pulse by the input section of said third substage, to said first and second substages to permit said first substage to receive the fourth count pulse and to prevent the second substage from receiving said fourth count pulse; said output of said output section of said third substage, as a result of the receipt of said third count pulse, further being passed via said second means to the control section of said third substage to prevent the receipt by said input section of said third substage of said fourth count pulse; said alternate control of said input sections continuing on all successive count pulses to permit said first substage to receive the first count pulse of each three count group, said second substage to receive the second count pulse of each three count pulse group, and said third substage to receive the third count pulse of each three count pulse group; a plurality of seventh means each connecting the output section of the first substage of a stage to the common count line of the next succeeding stage; and an eighth means connecting the common count line of the first stage to a source of count pulses, whereby said first stage receives count pulses and each succeeding stage receives a pulse each time the previous stage receives a count pulse at its first substage.

9. A multi-stage asynchronous counting device capable of counting according to a modulo three number system comprising: a plurality of counting stages, each stage registering the counts within a distinct order of said number system, each of said stages composed of a first, second and third substage, each substage arranged to register a distinct one of the numbers of said modulo three number system, each of said substages further comprising an input section adapted to receive count pulses in a sequential manner from a common count line, an output section for producing an output signal in accordance with the count pulses received by said input section and a control section for controlling the receipt of count pulses by said input section; a plurality of first means, each connecting the control section of a single substage to the input section of the same substage to permit said control section to alert said input section and permit said input section to receive and count said count pulses, only one of said input sections being alerted to receive a count pulse at any count pulse time; a plurality of second means, each connecting the input and output sections of a single substage to the control section of the same substage to actuate said control section in response to the condition of said input and output sections at the termination of a count pulse, a plurality of third means, each interconnecting the input section of a single substage to the output section of the same substage to cause said output section to produce an output signal upon receipt by said input section of a count pulse; a plurality of fourth means each connecting the output sections of the substages of a single stage, to permit the passage of the output signal produced by the output section of said first stage, as a result of the receipt of the first count pulse by the input section of said first stage, to said second and third substages to permit said second substage to receive the second count pulse and prevent said third substage from receiving said second count pulse; said output of said output section of said first substage in response to said first count pulse further being passed via said second means to the control section of said first substage to prevent said input section of said first substage from receiving said second count pulse; a plurality of fifth means each connecting the output sections of the substages of a single stage to permit the passage of the output signal produced by the output setcion of said second substage, as a result of the receipt of said second count pulse by the input section of said second substage, to said first and third substages to permit said third substage to receive the third count pulse and to prevent said first substage from receiving said third count pulse; said output of said output section of said second substage, as a result of the receipt of said second count pulse, further being passed via said second means to the control section of said second substage to prevent the receipt by said input section of said second substage of said third count pulse; a plurality of sixth means each connecting the output sections of the substages of a single stage to permit the passage of the output signal produced by the output section of said third substage, as a result of the receipt of said third count pulse by the input section of said third substage, to said first and first substages to permit said first substage to receive the fourth count pulse and to prevent the second substage from receiving said fourth count pulse; said output of said output section of said third substage, as a result of the receipt of said third count pulse, further being passed via said second means to the control section of said third substage to prevent the receipt by said input section of said third substage of said fourth count pulse; said alternate control of said input sections continuing on all successive count pulses to permit said first substage to receive the first count pulse of each three count pulse group, said second substage to receive the second count pulse of each three count pulse group, and said third substage to receive the third count pulse of each three count pulse groups; first presetting means connected to the output sections of said second and third substages of the first stage to permit the first substage to receive the first count pulse; second presetting means connected to the input sections of the first and third substages and the control section of said second substage of all succeeding stages to alter the sequence of receipt of count pulses by said substages of a stage to permit said first substage to receive the first pulse of each three count pulse group, said second substage to receive the second pulse of each three count pulse group and the third substage to receive the third pulse of each three count pulse group a plurality of seventh means each connecting the output section of the second substage of a stage to the common count line of the next succeeding stage; and an eighth means connecting the common count line of the first stage to a source of count pulses, whereby said first stage receives count pulses and each succeeding stage receives a pulse each time the previous stage receives a count pulse at its first substage.

References Cited by the Examiner

UNITED STATES PATENTS 3,114,883  12/1963  Arthur _____ 235—92
3,218,483  11/1965  Claffer _____ 307—88.5

FOREIGN PATENTS 845,371  12/1960  Great Britain.

OTHER REFERENCES

IBM Technical Disclosure Bulletins, vol. 4, No. 1, June 1961, pp. 44, 45; vol. 2, No. 6, April 1960, p. 100.

MAYNARD R. WILBUR, *Primary Examiner.*

J. F. MILLER, *Assistant Examiner.*